United States Patent

[11] 3,554,439

[72] Inventor Edward D. Sigl
 Fort Wayne, Ind.
[21] Appl. No. 855,824
[22] Filed Sept. 8, 1969
[45] Patented Jan. 12, 1971
[73] Assignee Bowmar Instrument Corporation
 Fort Wayne, Ind.
 a corporation of Indiana

[54] INTERNAL PINION COUNTER
 11 Claims, 4 Drawing Figs.
[52] U.S. Cl. ................................................. 235/139,
 235/103, 235/117
[51] Int. Cl. ...................................................... G06c 7/10,
 G06c 9/00, G06c 5/26
[50] Field of Search........................................... 235/117,
 103, 1.3, 139, 96, 139.1

[56] References Cited
 UNITED STATES PATENTS
1,439,097 12/1922 Graham........................ 235/139
2,351,814 6/1944 Holzner......................... 235/139
2,656,107 10/1953 Vogler........................... 235/96
2,969,175 1/1961 Bliss.............................. 235/1
3,107,855 10/1963 Miner............................ 235/139
3,452,297 7/1969 Bies et al. ..................... 235/117

Primary Examiner—Richard B. Wilkinson
Assistant Examiner—Stanley A. Wal
Attorney—Hood, Gust, Irish & Lundy ABSTRACT: A revolution counter having an input shaft with a units drum secured thereto. A sleeve coaxially surrounds a portion of the input shaft and has one end rigidly secured to a frame element. Bearings rotatably support the input shaft within the sleeve. The outer surface of the sleeve is cylindrical with a flat formed thereon. A transfer pinion is rotatably mounted on the unit's drum radially outwardly from the shaft and sleeve. A tens drum is rotatably mounted on a bushing supported on the sleeve and has a full tooth gear thereon meshing with the full tooth portion of the transfer pinion. A mutilated gear and locking cam is mounted on the sleeve between the units and tens drum, being restrained against rotation by the flat. The mutilated gear has a toothed portion and a mutilated portion with the locking cam being coextensive with the mutilated portion. The full tooth portion of the transfer pinion meshes with the toothed portion of the mutilated gear, thereby restraining rotation of the tens drum except during transfer, the mutilated portion of the transfer pinion being out of engagement with the locking cam when the toothed portion is in mesh with the toothed portion of the mutilated gear, the mutilated portion of the transfer pinion engaging the locking cam when the toothed portion is out of mesh with the toothed portion of the mutilated gear, thereby restraining rotation of the transfer pinion and rotationally advancing the tens drum by an incremental part of one revolution.

INVENTOR.
EDWARD D. SIGL,
BY Hood, Gust, Irish & Lundy
ATTORNEYS.

PATENTED JAN 12 1971
3,554,439
SHEET 2 OF 2

INVENTOR.
EDWARD D. SIGL,
BY Hood, Gust, Irish, Lundy
ATTORNEYS.

INTERNAL PINION COUNTER

BACKGROUND OF THE INVENTION

1. Field of the Invention

This invention relates generally to revolution counters, and more particularly, to revolution counters of the internal pinion type in which the transfer mechanism is totally enclosed within the number wheels.

2. Description of the Prior Art

Revolution counters conventionally comprise a plurality of successively higher ordered number wheels, coaxially disposed on a common shaft with an intermittent motion-transferring mechanism interposed between each pair of wheels, the transfer mechanism advancing the higher order wheel a predetermined angular amount responsive to a predetermined rotation of the respective lower order wheel. Thus, in one common form of revolution counter, each higher order number wheel is advanced through one only complete revolution in response to 10 revolutions of the next successive lower order number wheel, one revolution of a lower order number wheel thus providing a 36° incremental advance of the next higher order number wheel.

A common form of intermittent motion-transferring mechanism for revolution counters comprises a transfer pinion rotatably mounted on a fixed pinion carrier, the transfer pinion having a full toothed portion, such as eight teeth, and a mutilated portion, such as every other tooth of the full tooth portion removed leaving four teeth. A full tooth gear, such as having 20 teeth, is mounted on the higher order number wheel, the full tooth portion of the transfer pinion meshing with the full tooth gear. A two tooth gear and complementary locking cam is mounted on the lower order number wheel, the full tooth portion of the pinion cooperating with the two tooth gear and the mutilated portion cooperating with the locking cam to provide the transfer from the lower order wheel to the higher order wheel. In larger revolution counters, the number wheels are axially spaced apart with the transfer pinions being positioned respectively between the number wheels and rotatably mounted on a pinion shaft disposed exteriorally of the number wheels.

In order to reduce the overall size of the counter, it has been proposed to position the transfer pinions within the peripheral boundaries of the number wheels. Certain of these prior internal pinion counter constructions, such as those described and illustrated in U.S. Pat. Nos. 2,753,116 to G. L. Manke, 2,658,685 to H. H. Harada, and 1,692,489 to C. B. Dinsmore employed internal gears (as opposed to externally toothed, i.e., spur gears) formed on the number wheels themselves. Other prior internal pinion counters such as those shown and described in U.S. Pat. No. 2,287,792 to 2,287,792 to H. N. Bliss and U.S. Pat. No. 3,002,687 to R. W. Herr, and assigned to the assignee of the present application, employed spur gears. In each of these prior internal pinion counter constructions, a portion of the pinion carrier projected outwardly between the number wheels and was attached to a frame element thereby to restrain rotation of the pinion carrier. Such prior internal pinion counters of the internal gear type required casting or molding of the number wheels and internal gears. However, casting or molding of internal gear teeth with the requisite precision is difficult. Thus, such internal gear counters have generally not been suitable for applications requiring high speed operation. On the other hand, such prior internal pinion counters of the spur gear type have been somewhat complex and have required at least some of the component parts to have machining operations performed thereon, thus precluding molding or casting.

SUMMARY OF THE INVENTION

It is a general object of the present invention to provide a revolution counter construction which lends itself to incorporation in an internal pinion counter, which when incorporated in an internal pinion counter eliminates the pinion carrier of prior counter constructions which projected outwardly beyond the number wheels, thus permitting a highly miniaturized assembly, and particularly which incorporates a minimum number of component parts, most of which may, if desired, be molded from suitable plastic materials.

The invention, in broader aspects, provides a first member rotatable about a first axis with drive means for rotating the first member. A transfer pinion is provided mounted on the first member for rotation with respect thereto about a second axis spaced from and parallel with the first axis. A second member is provided rotatable about the first axis and axially spaced from the first member, and a full tooth gear is provided coaxial with the first axis and rotatable with the second member for driving the same, the transfer pinion having a portion in mesh with the full tooth gear. Intermittent motion transfer means is provided intermediate the first and second members and cooperating with the pinion, the transfer means rotationally advancing the second member by a predetermined incremental part of one revolution in response to a predetermined incremental part of one revolution in response to a predetermined rotation of the first member and restraining rotation of the second member except during its incremental advance, and means are provided for restraining rotation of the transfer means with respect to the first and second members.

It is accordingly an object of the invention to provide improved revolution counting apparatus.

A further object of the invention is to provide improved revolution counting apparatus of the internal pinion type.

Another object of the invention is to provide improved revolution counting apparatus of the internal pinion, spur gear type.

Another object of the invention is to provide improved revolution counting apparatus incorporating a minimum number of component parts, all of which may be molded from suitable plastic materials.

DESCRIPTION OF THE PREFERRED EMBODIMENT

Figure 1:
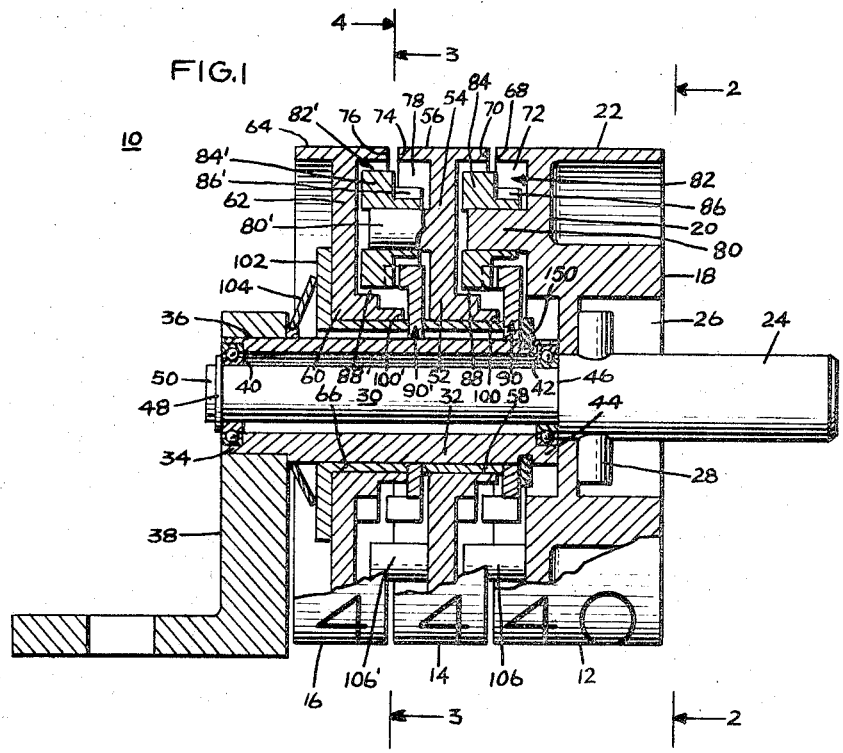
FIG. 1 is a side cross-sectional view illustrating an internal pinion, spur gear counter incorporating the invention.
Figure 2:
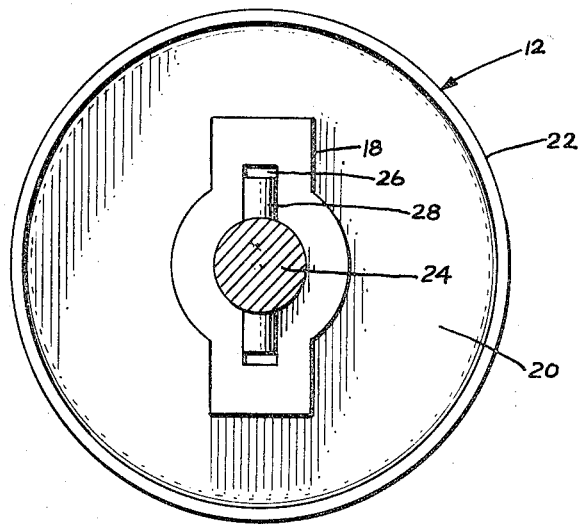
FIG. 2 is a cross-sectional view taken generally along the line 2–2 of FIG. 1.

Referring now to the figures of the drawing, the improved revolution counter construction of the invention, generally indicated at 10, is shown as including units, tens and hundreds number wheels or drums 12, 14, and 16, although it will be readily understood that one or more additional, higher order number wheels may be provided. Units drum 12 comprises a hub portion 18 having a web portion 20 extending radially outwardly therefrom, web portion 20 terminating in an outer annular flanged portion 22 having the units numerals displayed around its outer periphery. Units wheel 12 is coaxially mounted on input shaft 24, hub 18 having a radial slot 26 therein which drivingly receives a pin 28 extending through an aperture in input shaft 24. Thus, units wheel 12 is driven by rotation of input shaft 24.

Tens and hundreds number wheels 14 and 16, concentrically surround portion 30 of input shaft 24. A sleeve 32 coaxially surrounds shaft portion 30 and has one end 34 received in an opening 36 in frame element 38, being secured thereto against rotation. Suitable antifriction bearings 40 and 42 at the opposite ends 34 and 44 of sleeve 32 rotatably support portion 30 of input shaft 24. A shoulder 46 on input shaft 24 engages bearing 42, while a suitable snap ring 48 on end 50 of shaft portion 30 engages bearing 40, thus retaining input shaft 24 and units wheel 12 in assembled relation.

Tens wheel 14 comprises a hub portion 52 with a web portion 54 extending radially outwardly therefrom and terminating in an annular flanged portion 56 having the tens numerals displayed on its outer surface. Hub portion 52 is rotatably mounted on sleeve 32 by means of a suitable sleeve 32. Hundreds wheel 16 similarly comprises a hub portion 60 with a web portion 62 extending radially outwardly therefrom terminating in an annular flanged portion 64 having the hundreds numerals displayed on it its outer periphery. Hub portion 60 is rotatably mounted on sleeve 32 by means of a suitable bushing 66.

It will be seen that edges 68 and 70 of annular flanged portions 22 and 56 of number wheels 12 and 14 are closely adjacent whereas the web portions 20 and 54 are axially-spaced apart thereby defining a cavity 72. Similarly, edges 74 and 76 of annular flanged portions 56 and 64 of number wheels 14 and 16 are closely adjacent, whereas their web portions 20 and 54 are axially-spaced apart defining annular cavity 72.

A pin 80 extends axially in cavity 72 from web portion 20 of number wheel 12 toward web portion 54 of number wheel 14 with its end closely adjacent thereto, pin 80 being spaced from and parallel with input shaft 24. A conventional transfer pinion 82 is rotatably mounted on pin 80, pinion 82 having a full tooth portion 84 adjacent web portion 54 of number wheel 14 and a mutilated portion 86 adjacent web portion 20 of a number wheel 12. In the illustrated embodiment, full tooth portion 84 of pinion 82 is provided with eight teeth, mutilated portion 86 having every other tooth of the eight portion removed thereby providing four teeth.

Similarly, pin 80' extends axially in cavity 78 from web portion 54 of number wheel 14 toward web portion 62 of number wheel 16 with its end closely adjacent thereto, pins 80 and 80' being coaxial in the illustrated embodiment. Transfer pinion 82' having full tooth portion 84' and mutilated portion 86' is similarly rotatably mounted on pin 80' with full tooth portion 84' adjacent web portion 62 of number wheel 16 and mutilated portion 86' adjacent web portion 54 of number wheel 14.

Figure 3:
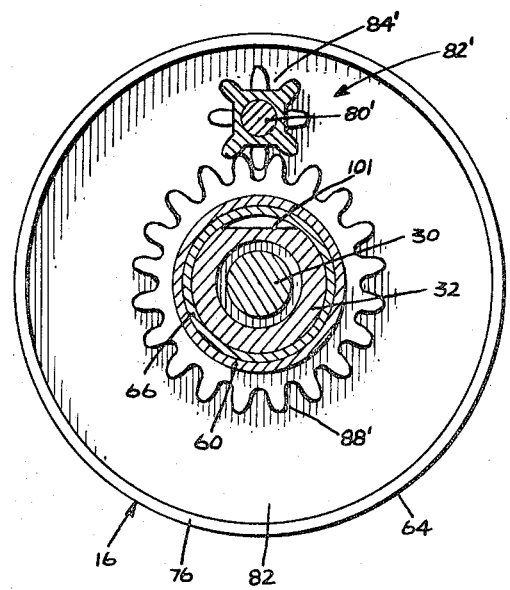
FIG. 3 is a cross-sectional view taken generally along the line 3–3 of FIG. 1.

A full tooth spur gear 88 is formed on hub portion 52 of number wheel 14 and meshes with full tooth portion 84 of transfer pinion 82. Similarly, a full tooth spur gear 88' is formed on hub portion 60 of number wheel 16 and meshed with full tooth portion 84' of transfer pinion 82'. In the illustrated embodiment, full tooth gears 88 and 80' are respectively provided with 20 teeth, as best seen in FIG. 3.

Figure 4:
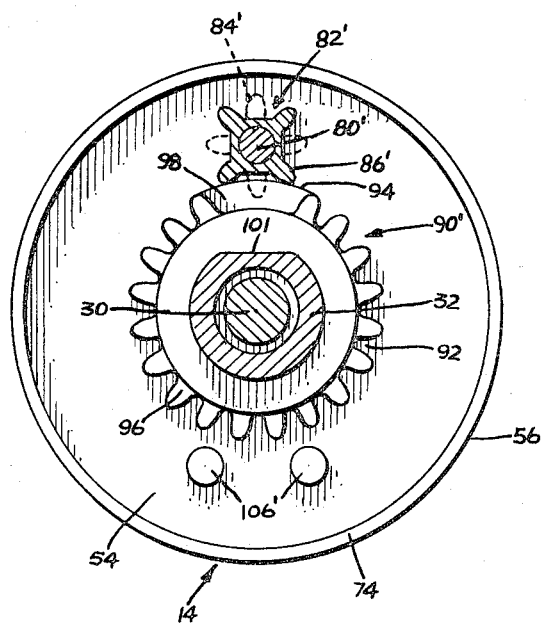
FIG. 4 is a cross-sectional view taken generally along the line 4–4 of FIG. 1.

Transfer members 90 and 90' are provided mounted on sleeve 32, being restrained against rotation thereby, and respectively cooperating with transfer pinion 82 and 82'. Referring particularly to FIG. 4, transfer members 90 and 90' respectively comprise a mutilated gear 92 and a cooperating locking cam 94. Mutilated gear 92 has a toothed portion 96 and a mutilated portion 98, the teeth of the toothed portion 96 having the same pitch and pitch diameter as the teeth of the full tooth gears 88 and 88'. In the illustrated embodiment, mutilated gears 92 and are 20 tooth gears with two teeth removed to form mutilated portion 98, locking cams 94 being coextensive with mutilated portion 98.

Sleeve 32 has a flat 101 formed thereon, transfer mechanisms 90 and 90' respectively having D-shaped openings therein complementary to the configuration of sleeve 32 thereby restraining transfer members 90 and 90' against rotation. In the illustrated and preferred embodiment, mutilated gears 92 and locking cams 94 are integrally formed. Locking cams 94 are respectively adjacent web portions 20 and 54 and respectively cooperate with mutilated portions 86 and 86' of transfer pinions 82 and 82'. Toothed portions 96 of mutilated gears 92 respectively mesh with the full tooth portions 84 and 84' of transfer pinions 82 and 82' except during the incremental transfer when the mutilated portions 86 and 86' of the transfer pinions engage the locking cams 94, as will hereinafter be described.

Transfer members 90 and 90' are respectively mounted for axial movement on sleeve 32 and bushings 58 and 66 of number wheels 14 and 16 are likewise mounted for axial movement on sleeve 32. It will be seen that hub portions 52 and 60 along with bushings 58 and 66 respectively have edges 100 and 100' which are closely adjacent to transfer mechanisms 90 and 90'. Bushing 66 has an outwardly extending portion 102 which engages web portion 62 of number wheel 16. A suitable spring member 104 acts between frame element 38 and flange 102 of bushing 66 thereby to urge bushing 66, transfer member $\pi'$, bushing 58, and transfer member 90 axially toward snap ring 150, thereby retaining the mechanism in assembled relation.

It will be seen that the entire mechanism is retained in assembled relation with only snap ring 150 and spring washer 104. Thus, in order to assemble the counter 10 with sleeve 32 already secured to frame element 38, spring washer 104, bushing 66, number wheel 16, transfer member 90', bushing 58, number wheel 14 with transfer pinion 82' assembled on pin 80', transfer member 90 and snap ring 150 are assembled on sleeve 32, in that ore order. Then, with bearings 40 and 42 positioned in the opposite ends of sleeve 32 and with number wheel 12 secured to input shaft 24 and having pinion 82 assembled thereon, portion 30 of input shaft 24 is inserted in bearings 40 and 42, attachment of snap ring 48 thus completing the assembly. It will be observed that the transfer members 90 and 90' are respectively held in captive relationship between bushing 58 and snap ring 150, and between bushings 58 and 66. It will likewise be observed that transfer pinions 80 and 82' are held in captive relationship between web portions 20 and 54 of number wheels 12 and 14, and between web portions 54 and 62 of number wheels 14 and 16.

In the preferred embodiment, number wheels 12, 14 and 16, including pins 80 and 80' and spur gears 88 and 88' are integrally molded of suitable plastic material, transfer pinions 82 and 82' are integrally molded, and transfer mechanisms 90 and 90' are likewise integrally molded, a suitable plastic material for all of these component parts being black polysulfone resin, or other suitable material. Number wheels 12 and 14 which carry transfer pinions 82 and 82' many have pins 106 and 106' molded thereon diametrically opposite pins 80 and 80' to serve as counterweights.

In operation of the illustrated embodiment in which each higher order number wheel is advanced by one revolution in response to 10 revolutions of the next lower order number wheel, i.e., one revolution of the lower order number wheel will provide an incremental advance of 36° of the next higher order number wheel, and referring particularly to the cooperative relationship of number wheels 14 and 16, it will be seen that full tooth portion 84' of transfer pinion 82' is at all times in mesh with full tooth gear 88' of number wheel 16. As number wheel 14 rotates through 324°, full tooth portion 84' of transfer pinion 82' will be in mesh with toothed portion 96 of mutilated gear 92 and since mutilated gear 92 is restrained against rotation, the meshing engagement of toothed portion 96 with full tooth portion 84' of transfer pinion 82' will rotate the transfer pinion about pin 80', thereby restraining full tooth gear 88' and number wheel 16 against rotation. It will be observed that the mutilated portion 86' of transfer pinion 82' will be out of engagement with locking cam 94 during this 324° rotation of number wheel 14 and transfer pinion 82'. Upon completion of 324° of rotation of number wheel 14 and transfer pinion 82', mutilated portion 86 of pinion 82' will move into engagement with locking cam 94, full tooth portion 84' moving into mutilated portion 98 of mutilated gear 92 and thus out of mesh with toothed portion 96. Engagement of mutilated portion 86' of transfer pinion 82 with locking cam 94 restrains pinion 82' against rotation on pin 80' and thus, continued rotation of number wheel 14 through the 36° annular extent of locking cam 94 with pinion 82' restrained against rotation with respect to number wheel 14, will rotationally advance full tooth gear 88' and number wheel 16 through a 36° increment, i.e., one-tenth of one revolution.

It will be observed particularly in FIG. 1 that bushings 58 and 66 are slightly longer than hub portions 52 and 60, respectively, the hub portions being rotatably mounted on the respective bushings. Bushings 58, 66 are prevented from rotating by the solid stack-up along sleeve 32 consisting of spring member 104, bushing 66, mutilated gear 90', bushing 58, mutilated gear 90, and snap ring 150, the spring pressure of member 104 thus preventing rotation of the bushings. The provision of hubs 52,60 of number wheels 14,16 slightly narrower than the respective bushings 58, 66 permits end play of the wheels and rotation about the sleeves. However, the mutilated gears 90, 90' are properly spaced between the bushings 58,66, and snap ring 150, and thus are prevented from any axial or rotational movement so that transfers to the adjacent wheels are effected.

It will now be seen that the revolution counter construction of the invention is characterized by its simplicity and minimal number of component parts, most of which lend themselves to molding from plastic material. While an internal pinion, spur gear construction is shown, i.e., with the transfer pinions located entirely within the peripheries of the number wheels, it will be seen that if minimum size is not a requirement, transfer pinions may project outwardly between the number wheels. Further, while spur gears 88 and 88' are shown and are considered preferable, it will be understood that internal gears may be employed for driving the number wheels 14 and 16. Still further, while a mutilated spur gear and locking cam combination 90,90' is shown and is considered preferable, it will be understood that an internally toothed mutilated gear and locking cam combination may be employed, which, however, would then necessitate employment of a portion projecting outwardly between the number wheels for restraining the transfer mechanism against rotation.

While there have been described above the principles of this invention in connection with specific apparatus, it is to be clearly understood that this description is made only by way of example and not as a limitation to the scope of the invention.

I claim:

1. Revolution counting apparatus comprising: a first member rotatable about a first axis; drive means for rotating said first member; a transfer pinion and means for mounting the same on said first member for rotation with respect thereto about a second axis spaced from and parallel with said first axis; a second member rotatable about said first axis and axially spaced from said first member; a full tooth gear coaxial with said first axis and rotatable with said second member for driving the same, said pinion having a portion in mesh with said full tooth gear; intermittent motion transfer means intermediate said first and second members and cooperating with said pinion for rotationally advancing said second member by a predetermined incremental part of one revolution in response to a predetermined rotation of said first member and for restraining rotation of said second member except during said advance thereof; and means for restraining rotation of said transfer means with respect to said first and second members.

2. The apparatus of claim 1 wherein said pinion has a full tooth portion and a mutilated portion, said full tooth portion of said pinion being in mesh with said full tooth gear; said transfer means comprising a mutilated gear having a toothed portion and a mutilated portion, and a locking cam, said full tooth portion of said pinion being in mesh with said toothed portion of said mutilated gear and rotated thereby, thereby restraining rotation of said full gear and second member except during said advance thereof, said mutilated portion of said pinion engaging said locking cam and being thereby restrained against rotation thereby to impart said incremental advance to said full tooth gear and second member; said mutilated portion of said pinion being out of engagement with said locking cam when said toothed portion of said pinion is in mesh with said toothed portion of said mutilated gear, said toothed portion of said pinion being out of mesh with said toothed portion of said mutilated gear when said mutilated portion of said pinion engages said locking cam.

3. The apparatus of claim 2 wherein the teeth of said toothed portion of said mutilated gear have substantially the same pitch and pitch diameter as the teeth of said full tooth gear, said locking cam being coextensive with said mutilated portion of said mutilated gear and having an angular extent corresponding to that of said incremental advance.

4. A The apparatus of claim 1 wherein said drive means comprises an input shaft coaxial with said first axis and having said first member mounted thereon and rotatable therewith; and further comprising a frame first means for rotatably supporting said input shaft on said frame, and second means for rotatably supporting said second member on said frame; said restraining means including means for mounting said transfer means on said frame.

5. The apparatus of claim 4 wherein said transfer means and second member concentrically surround a portion of said input shaft, said mounting means comprising a sleeve surrounding said shaft portion and rigidly secured to said frame and means for securing said transfer means to said sleeve, said second supporting means comprising means for rotatably mounting said second member on said sleeve.

6. The apparatus of claim 5 wherein said first supporting means comprises at least one bearing rotatably mounting said shaft portion within said sleeve, said securing means comprising a flat surface on the outer periphery of said sleeve engaged by a complementary surface of said transfer means.

7. The apparatus of claim 1 wherein said first and second members are drums respectively having radially outwardly extending web portions terminating in annular flange portions respectively having indicia as their outer peripheries, said flange portions respectively having edges which are closely adjacent, said web portions being axially spaced apart and defining an annular cavity with said flange portion, said transfer pinion being rotatably mounted on said web portion of said first member in said cavity, said full tooth gear and transfer means being disposed in said cavity.

8. The apparatus of claim 3 wherein said full tooth gear and mutilated gear are spur gears.

9. The apparatus of claim 8 wherein said drive means comprises an input shaft coaxial with said first axis and having said first member mounted thereon and rotatable therewith, said second member and transfer means concentrically surrounding a portion of said shaft; and further comprising a frame, said restraining means comprising a sleeve coaxially surrounding said shaft portion and rigidly secured to said frame, at least one bearing rotatably supporting said shaft within said sleeve, said sleeve having a cylindrical outer surface with a flat formed thereon, said mutilated gear being coaxially mounted on said sleeve and having a complementary portion engaging said flat thereby restraining rotation thereof, said locking cam being secured to said mutilated gear, said second member being rotatably mounted on said sleeve.

10. The apparatus of claim 9 wherein said first and second members are drums respectively having radially outwardly extending web portions terminating in annular flange portions respectively having indicia on their outer surfaces, said flange portions respectively having edges which are closely adjacent, said web portions being axially spaced apart and defining an annular cavity with said flange portions; said pinion mounting means comprising a pin on said web portion of said first member and extending axially toward said web portion of said second member in said cavity, said pinion being rotatably mounted on said pin with said mutilated portion closely adjacent said web portion of said first member and said full tooth portion closely adjacent said web portion of said second member; said mutilated gear and locking cam being disposed in said cavity with said locking cam closely adjacent said web portion of said first member, said sleeve having one end secured to said frame and extending axially toward said first member, said mutilated gear being axially movable on said sleeve; said second member having a hub portion rotatably mounted on a bushing mounted on said sleeve, said web portion of said second member extending outwardly from said hub portion, said bushing extending in said cavity axially toward said mutilated gear and having an end engaging said mutilated gear, said full tooth gear extending outwardly from said hub portion, said hub portion being axially movable on said bushing; and further comprising means for restraining movement of said mutilated gear and locking cam on said sleeve toward said first member, and resilient means o for urging said bushing toward said mutilated gear and locking cam thereby holding said counter in assembled relation.

11. The apparatus of claim 10 wherein the web and flange portions of said first member and said pin are integral; said web, flange and hub portions of said second members and said full tooth gear being integral; said mutilated gear and locking cam being integral.

UNITED STATES PATENT OFFICE
CERTIFICATE OF CORRECTION

Patent No. 3,554,439                    Dated   January 12, 1971

Inventor(s)   Edward D. Sigl

It is certified that error appears in the above-identified patent and that said Letters Patent are hereby corrected as shown below:

SPECIFICATION

Column 1, line 51  - "to 2,287,792" should be deleted.
Column 2, lines 19-20  -  "incremental part of one revolution in response to a predetermined" should be deleted.
Column 3, line 25 - cancel "a", second occurrence;
       line 28 -   ---tooth--- should be inserted ahead "portion".
       line 42 - "meshed" should be --meshes--.
          57 - "and" should be deleted.
Column 4, line 9  - " $\pi$ ' " should be changed to --90'--.
       line 20 - "ore" should be deleted.
       line 40 - "many" should be --may--.

CLAIMS

Claim 4, Col. 6, line 7 - "A" should be deleted.
Claim 10, Col. 7, line 6 - "o" should be deleted.

Signed and sealed this 18th day of January 1972.

(SEAL)
Attest:

EDWARD M. FLETCHER, JR.                ROBERT GOTTSCHALK
Attesting Officer                      Acting Commissioner of Patents